Jan. 19, 1960 H. LIST 2,921,842
APPARATUS FOR THE CONTINUOUS TREATMENT OF
SOLID SUBSTANCES WITH LIQUIDS OR GASES
Filed Nov. 26, 1956 3 Sheets-Sheet 1

INVENTOR:
Heinz List
by Michael S. Striker
Agt.

INVENTOR:
Heinz List
by Michael S. Striker
Agent

United States Patent Office 2,921,842
Patented Jan. 19, 1960

2,921,842

APPARATUS FOR THE CONTINUOUS TREATMENT OF SOLID SUBSTANCES WITH LIQUIDS OR GASES

Heinz List, Pratteln, Switzerland, assignor to Buss A.G., Pratteln, Switzerland

Application November 26, 1956, Serial No. 624,277

Claims priority, application Switzerland November 26, 1955

1 Claim. (Cl. 23—270)

Apparatus hitherto known for the continuous treatment of solid substances with liquids or gases—by way of example for extraction, reaction, washing processes, etc.— have as their essential feature a conveyor device for the solid substances and pumping arrangements for the liquids or gases, to operate the apparatus according to the counter-flow or uniflow principle. Tower-like apparatus are also known in which the solid substance is fed in continuously at the top in granular powdery or other form suitable for the process and is drawn off continuously at the bottom whilst the liquid or gas moves in counter-flow or uniflow thereto, or in which the column of the solid substance is lifted from the bottom to the top by means of a worm conveyor.

These tower-like vertically operating apparatus have, however, that in common that the liquid or gas flow likewise takes place vertically only so that on the one hand the solid substance column may not be too high in order to avoid too great a resistance and on the other hand fractionated operation cannot be carried out. A further draw-back with vertical solid substance columns is the formation of the dreaded channels primarily extending vertically and impairing the yield.

According to the present invention, these draw-backs are avoided by providing a perforated central pipe and by perforating the outer wall of the tower and by providing in addition to the vertical main flow of liquid or gas a horizontal flow passing approximately horizontally from the central pipe to the outer wall or vice versa.

By way of example, several embodiments of the invention are shown in the accompanying drawings in which.

Figure 1:
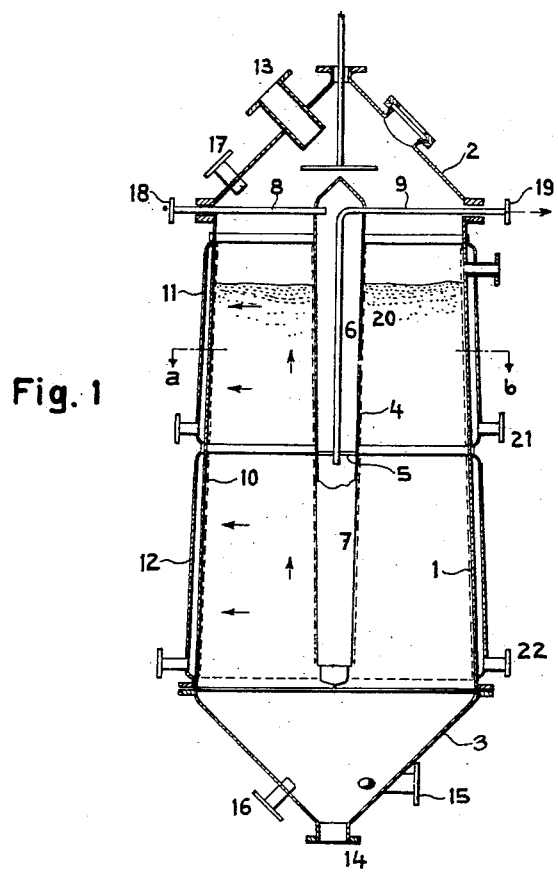
Fig. 1 shows a vertical section through the apparatus with fixed central tapered outlet and hydraulic disaggregating device.
Figure 2:
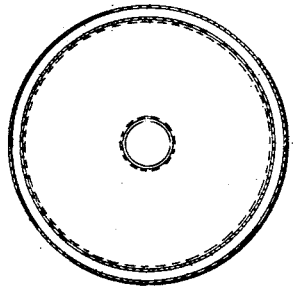
Fig. 2 shows a horizontal section to Fig. 1.

The principle of the apparatus is illustrated in Fig. 1. The tower 1 appropriately conically shaped towards the bottom is provided at the top with the inlet cover 2 and at the bottom with the outlet taper 3. The perforated central pipe 4 is subdivided into two chambers 6 and 7 by the partition 5, said chambers having separate admission means for the liquid or the gas constituted by conduits 8 and 9. Similarly the perforated outside wall 10 is provided with two separate double jackets 11 and 12 for the fractionated infeed and outfeed of the liquid or gas.

The infeed of the solid substances takes place through pipe sockets 13 and the outflow through the pipe socket 14, the material which tends to settle in the outlet taper can be broken up by means of a strong liquid jet issuing from the tangential pipe socket 15. Liquid or gas is led in or led out by means of the pipe sockets 16 in the outlet taper and the pipe sockets 17 in the inlet cover respectively depending on whether uniflow or counterflow is required. In addition to this main flow, the liquid is now forced by means of pumps in two separate circuits horizontally in cross-flow through the pipe sockets 18 and 19 and the chambers 6 and 7 of the perforated central pipe 4 and the column of solid substance 20 and passes through the perforations of the outside wall 10 out into the double jackets 11 and 12 from where it is again passed to the pumps through the pipe sockets 21 and 22 respectively. Conduits 8, 9 and pipe sockets 21, 22 form therefore conduit means for directing a fluid from the interior of the pipe or foraminous tube 4 in transverse direction through the interior of the tower into the space between the foraminous line 10 and the outer walls 11, 12 of the tower. In principle, reversal of the direction of flow from the outside wall to the central pipe is also possible. The repeated circulation of the liquid or the gas in cross-flow increases the effectiveness of the apparatus, improves the yield, and reduces the time of treatment.

Figure 3:
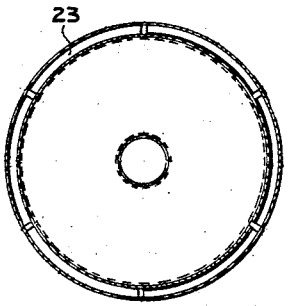
Fig. 3 shows a horizontal section with cell-shaped radial subdivision of the filter surface.

The perforation of the filter surfaces preferably carried out in such a manner that seen from top to bottom gliding surfaces for the solid substance become apparent and the orifices for the liquid are directed downwardly or laterally. The perforated surfaces may also be lined with suitable filter fabrics. With various substances there is the danger that these surfaces may become clogged in time. They may be cleaned in a simple manner by subdividing the filters and filter surfaces according to Fig. 3 into cells 23 and by clearing the obstructions from the filter surfaces by means of a flow of liquid from the outside, viz. by a so-called return-flow. This return-flow can take place during operation cell by cell in any desired sequence or by a combination of several cells.

In this connection it is of importance to mention that by means of this cross-flow an auto-filtration takes place, i.e. the fine particles of the solid substance settle out in the material itself and thus the liquid is already to a large extent pre-cleaned when it reaches the perforated outside wall.

Figure 5:
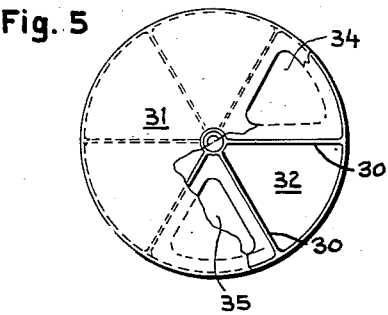
Fig. 5 shows a top view of the cell disc.
Figure 4:
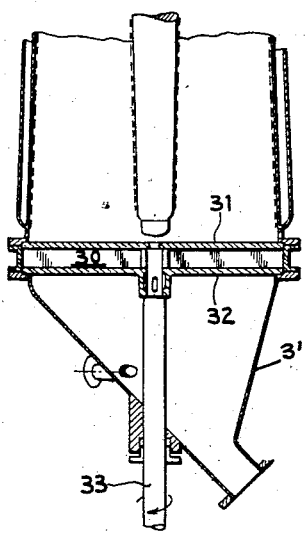
Fig. 4 shows a vertical section through the cell disc for the continuous outfeed of the solid substances.

In spite of the hydraulic disaggregation, certain solid substances render the outfeed by means of the taper outlet impossible. For this purpose the arrangement shown in Figs. 4 and 5 was developed. It consists of the fixed radial spacer plates 30 above and below which the discs 31 and 32 are arranged which discs are secured to the shaft 33 and rotated slowly. Discs 31, 32 form together with spacer plates 31 a plurality of cells or chambers in the form of circular sectors. The upper disc 31 is provided with an opening 34 therethrough, whereas the lower disc 32 is provided with an opening 35 therethrough angularly displaced from the opening 34 as best shown in Figure 5. The operation of this arrangement is self-evident from the construction just described. When the discs 31 and 32 are slowly rotated by the shaft 33 the material in the tower will fall by gravity through the opening 34 in the upper disc 31 so that the cells or chambers constituted by the spacer plates 30 and the upper and lower discs 31 and 32 will be consecutively filled as the discs rotate. It is further evident, that when the opening 35 provided in the lower disc 32 passes underneath one of the thus filled cells, the material therein will fall into the outlet socket 3' shown in Figure 4. During rotation of the discs 31, 32 by the shaft 33, the material will therefore be gradually transferred from the interior of the tower 1 into the outlet socket 3'.

Figure 6:
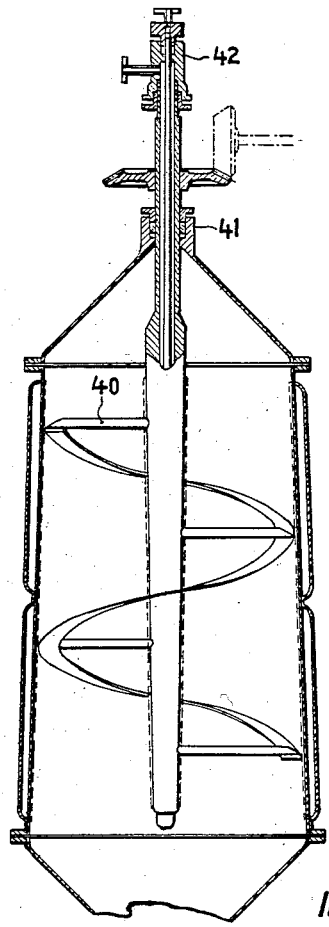
Fig. 6 shows the adaption of the central pipe as a guide.

It may also be necessary to disaggregate the solid substance from time to time by means of a stirrer or by means of vibrators. For this purpose e.g. the central pipe is adapted as a stirrer according to Fig. 6. It is provided with the stirring arms 40 and is led out of the tower through a stuffing box 41. The admission of the liquids or gases takes place, in this instance, through a stuffing box 42 which is provided here for two connections corresponding to the two cross-flow regions of Fig. 1. Obviously the number of cross-flow regions may be increased at will. Likewise it is possible to subdivide the column of solid substance in high towers by fitting further cell discs.

Figure 7:
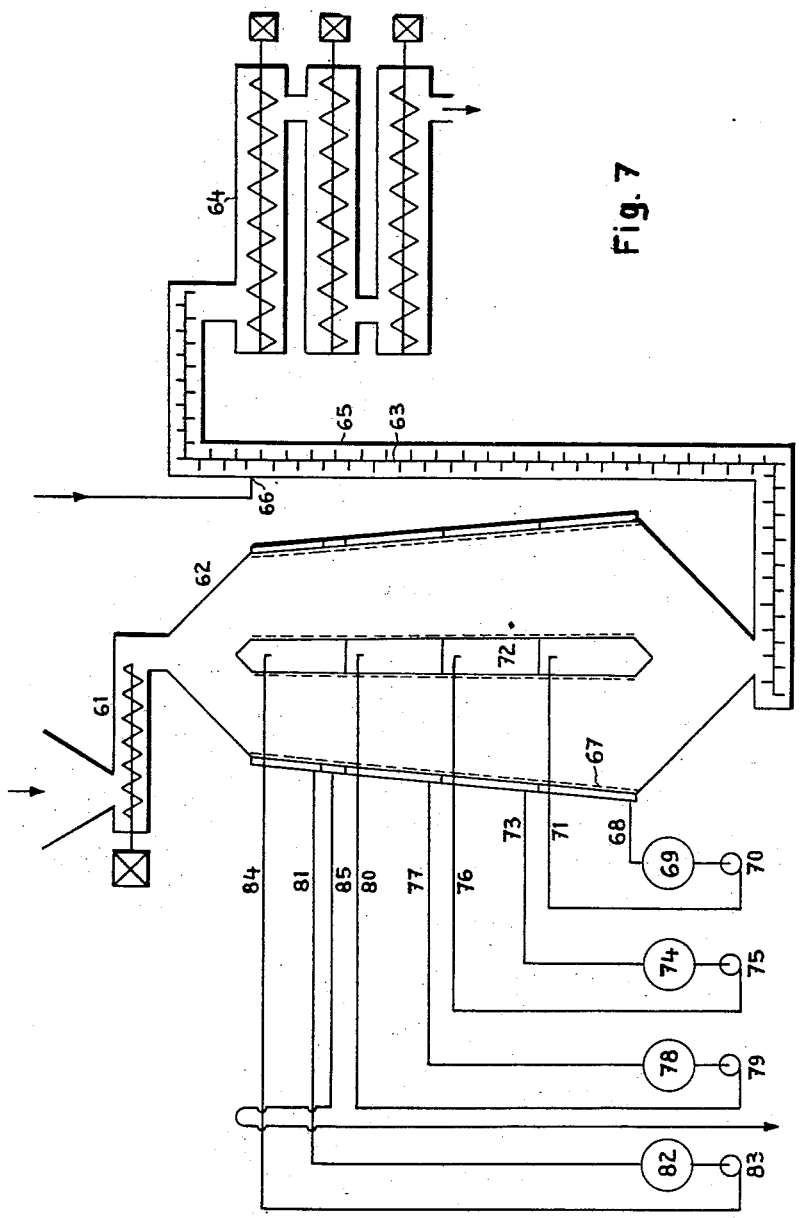
Fig. 7 shows, by way of example of its application, the apparatus with additional devices.

As a practical example of application, Fig. 7 illustrates a continuous extraction plant.

The material to be extracted is fed into the extractor 62 continuously by a worm 61 or other conveyor device. The material is continuously drawn off by a further conveyor device—by way of example a drag chain conveyor 63—from the bottom of the extractor and conveyed into a dryer, e.g. the worm dryer 64, so that the material present in the extractor gravitates downwardly. The outfeeding device is built into a vertical pipe 65 in which the solvent filled in at 66 can communicate with the extractor. The solvent thus moves in counter-flow to the material. A part of the solvent already saturated with the extract—called miscella—flows out of the extractor through the lowest part of the filter wall 67 in the extractor through the pipe line 68 into an intermediate tank 69 out of which it is drawn off by a pump 70 and pumped through a pipe line 71 into the lowest part of the central pipe 72 in the extractor. The central pipe also has a filter wall through which miscella flows back into the material under the effect of the pump pressure and thus is moved in cross-flow respective to the material. This operation of the miscella conducted in cross-flow may be repeated—e.g. three times—through the pipe lines 73, 77, 81 and the tanks 74, 78, 82 respectively by means of the pumps 75, 79, 83 and the pipe lines 76, 80, 84 respectively. The miscella, which may carry along fine particles through the filter wall out of the extractor, is filtered by the material itself during the cross-flow motion. In order to increase the purity of the miscella a partial uniflow motion is enforced in the top part of the extractor by the miscella withdrawn from the top part of the extractor being once more forced to pass transversely through the material, this time, however, lower down, i.e. it is moved in the same direction as the material, before it finally leaves the extractor through the pipe line 85. Thus in this example of the apparatus the extraction of the material is carried out with a solvent directed in a counter-flow, a short uni-flow and a simultaneous cross-flow, the miscella being filtered by the material itself.

What I claim is:

An apparatus for the continuous treatment of granular or powdered material with fluids comprising, in combination, a tower having a peripheral wall, a top wall formed with an inlet opening for continuously feeding material to be treated into the interior of the tower, and a bottom wall formed with an outlet opening for continuously discharging treated material from said tower so that the material to be treated may flow continuously in longitudinal direction through said tower; fluid passage means respectively located in said top wall and in said bottom wall of said tower and communicating with the interior thereof for introducing fluid at the top of and removing fluid from the bottom of said tower; a foraminous tube extending in longitudinal direction of said tower and being located substantially centrally in the interior thereof; a foraminous liner surrounding said tube and being located closely adjacent said peripheral wall of said tower but spaced therefrom, said foraminous tube having a bottom end spaced from said bottom wall of said tower; conduit means respectively communicating with the interior zone of said foraminous tube and the zone between said foraminous liner and said peripheral wall of the tower for introducing fluid into the tower from one of said zones and for removing fluid from the other of said zones, whereby the material passing continuously in longtiudinal direction through said tower may be treated by two fluids one of which is introduced through the top of the tower and the other of which is introduced from said one zone into the tower, the simultaneous withdrawal of the fluids through the bottom of the tower and said other zone assuring an intimate, uniform contact between material and fluids as the material passes continuously through the tower and preventing the formation of fluid channels in the material; a pair of discs located spaced from each other in the space between said bottom end of said tube and said bottom wall, said discs extending transversely through said tower and having each a peripheral portion in sliding engagement with said peripheral wall thereof; drive means connected to said discs for rotating the same about the axis thereof; a plurality of spacer plates having respectively top and bottom edges in sliding contact with said discs and extending in radial direction substantially from the center thereof toward said peripheral wall of said tower and being fixedly connected to the latter so that said spacer plates form together with said discs a plurality of chambers having each parallel to said discs a cross-section in the form of a circular sector, each of said discs being formed with an opening therethrough of a cross-section substantially identical with said cross-section of said chambers and said openings in said discs being angularly displaced from each other so that said openings respectively communicate during the rotation of said discs with chambers separated from each other by at least one chamber.

References Cited in the file of this patent

UNITED STATES PATENTS

| | | |
|---|---|---|
| 2,156,236 | Bonatto | Apr. 25, 1939 |
| 2,214,978 | Teatini | Sept. 17, 1940 |
| 2,265,837 | Harding | Dec. 9, 1941 |